(12) United States Patent
Schnackenberg

(10) Patent No.: US 7,235,741 B2
(45) Date of Patent: Jun. 26, 2007

(54) PARALLEL CONNECTION KIT FOR POWER GENERATORS

(75) Inventor: Paul Schnackenberg, Cumming, GA (US)

(73) Assignee: Gen-Tran Corporation, Roswell, GA (US)

(*) Notice: Subject to any disclaimer, the term of this patent is extended or adjusted under 35 U.S.C. 154(b) by 0 days.

(21) Appl. No.: 10/966,661

(22) Filed: Oct. 15, 2004

(65) Prior Publication Data

US 2006/0081392 A1 Apr. 20, 2006

(51) Int. Cl.
*H02G 3/04* (2006.01)
(52) U.S. Cl. .................. 174/72 A; 174/153; 174/74 R; 174/71 R; 174/79
(58) Field of Classification Search ................ 174/135, 174/74 R, 72 A, 71 R, 79, 66, 21, 70 R
See application file for complete search history.

(56) References Cited

OTHER PUBLICATIONS

PowerStay, Installation Instructions for Parallel Power Kit model 30501 and 73131, 1 page, internet dated Aug. 22, 2003.*
PowerStay, Mounting Instructions for Parallel Power Kit model 30501A and 73131A, 2 pages, internet dated Jun. 2004.*
Gen-Tran Corporation Brochure, published at least as early as Oct. 15, 2003, showing a parallel connection kit which is hung by a hook on the carrying handle of a generat.
Packaging for a parallel power kit, sold by Reliance Controls, Inc., at least as early as Oct. 14, 2004, showing a flexible fabric strap affixed to the carrying handle of a generator, for supporting the wiring box for the parallel connection kit.
Photo of a simple wiring—only parallel connection kit, without a central housing, offered for sale by Southwest Supply Co., at least as early as Oct. 14, 2004.
Photo from an eBay listing, of a simple wiring—only parallel connection kit, without a central housing, offered for sale by Big Sky Power Equipment Sales, at least as early as Oct. 14, 2004.
Printout from website for Tele-Lite, showing a bracket for mounting a light directly to a generator, showing a bracket as used in an embodiment of the present invention. This bracket was on sale at least as early as Oct. 14, 2004.
Photos 1-4, illustrate a parallel connection kit product manufactured and sold by Reliance Controls Inc. at least as early as Oct. 14, 2003, using a fabric strap with a hook and loop fastener, to hold a wiring unit to a generator handle.

* cited by examiner

*Primary Examiner*—Jinhee Lee
(74) *Attorney, Agent, or Firm*—Greenberg Traurig LLP

(57) ABSTRACT

A kit for connecting in parallel two electrical generators, including a wiring unit mounted on an attachment frame which is configured to be rigidly affixed to one of the two electrical generators. The wiring unit includes an external output receptacle, and a circuit breaker, plus hard-wired connections for receiving the power inputs from the two electrical generators being connected in parallel. The wiring unit is screwed or otherwise fastened to a preferably contoured bracket which, in turn, is screwed or otherwise fastened, preferably, to a frontal area of one of the two generators.

3 Claims, 16 Drawing Sheets

PARALLEL CONNECTION KIT FOR POWER GENERATORS

BACKGROUND OF THE DISCLOSURE

1. Field of the Invention

The present invention relates in general to portable power generation devices and accessories therefor.

2. Background Art

Portable power generation devices are well known. Some of these devices, having power outputs large enough to single-handedly supply most or all of an average household's power requirements, for at least a short period of time, are relatively heavy and are supported by tubular metal frames, which may or may not be supplied with wheels and handles to enable them to be moved from place to place. While these power generation devices are at least nominally designated "portable", in reality, the weight and bulk of these devices makes them not conveniently portable.

A newer generation of portable power generation devices has been developed, which are smaller self-contained units that have all-enclosing housings, and built-in handles, usually on their top surfaces. These smaller units are typically of sufficient power for uses such as camping, recreational vehicle, or light construction or other job-site uses. Occasionally, it has been found desirable, in situations in which a single one such smaller power generation device has been found to be insufficient to meet power requirements, to connect two such power generation devices in parallel, so as to increase the total current output, while maintaining the output voltage of the paired units the same as for a single unit.

Devices for parallel connection of power generation devices are known. Typically, these connection devices can be little more than a group of wires, having the appropriate end connectors, which are banded together. In other embodiments, the connection device may be in the form of a box housing, having appropriate internal circuitry, which housing has terminals, to which leads from or to each of the respective power generation devices are connected. Such a box housing in the past has either been entirely unconnected to either of the power generation devices, or possibly joined to one or the other of the power generation devices by a flexible strap. Such arrangements can be cumbersome, and can lead to a sprawling of wires, leads and circuitry boxes, which can be unsightly, difficult to move readily from place to place, and potentially hazardous.

It would be desirable to provide an alternative construction for a parallel connection kit for power generation devices, which is easier to physically manipulate and manage, and provides for facilitated electrical connection of the power generation devices to be connected.

These and other desirable characteristics of the present invention will become apparent in view of the present specification, including claims, and drawings.

SUMMARY OF THE INVENTION

The present invention comprises, in part, a kit for connecting the electrical outputs of at least two electrical generators in parallel. A wiring unit is provided, having at least two input electrical connections, operably configured to receive electrical leads connected to the outputs of a corresponding at least two electrical generators, and at least one output electrical receptacle, operably configured to receive an electrical lead to be connected to a load. An attachment frame is operably affixed to the wiring unit, and, in turn, is operably configured to be rigidly affixed to an electrical generator.

The wiring unit preferably further comprises a circuit breaker electrically connected to the at least two input electrical connections and at least one output electrical receptacle, for providing overload protection to electrical generators when connected by the kit.

The present invention also comprises in part a first electrical generator, in combination with a kit for connecting the electrical outputs of the first electrical generator in parallel with at least one other electrical generator. The combination comprises a first electrical generator; a wiring unit, having at least two input electrical connections, operably configured to receive electrical leads connected to the output of the first electrical generator and at least one other electrical generator, and at least one output electrical receptacle, operably configured to receive an electrical lead to be connected to a load; and an attachment frame, to which the wiring unit is operably affixed, and which, in turn, is rigidly affixed to the first electrical generator.

The present invention also comprises a method for connecting two electrical generators in parallel. The method comprises the steps of:

providing a wiring unit, having at least two input electrical connections, operably configured to receive electrical leads connected to the outputs of a corresponding at least two electrical generators, and at least one output electrical receptacle, operably configured to receive an electrical lead to be connected to a load; and providing an attachment frame;

affixing the wiring unit to the attachment frame;

rigidly affixing the attachment frame to one of two electrical generators;

electrically connecting an output of one of the two electrical generators to one of the input electrical connections of the wiring unit;

electrically connecting an output of the other of the two electrical generators to the other of the input electrical connections of the wiring unit;

electrically connecting a load to the at least one output electrical receptacle of the wiring unit.

The present invention is also directed to a power outlet adapter kit for power generators. The power outlet adapter kit comprises a wiring unit, having at least one input electrical connection, operably configured to receive at least one electrical lead connected to the output of a corresponding at least one electrical generator, and at least one output electrical receptacle, operably configured to receive an electrical lead to be connected to a load. The at least one output electrical receptacle has a plug configuration that is different from any output electrical receptacles which may be disposed on the at least one electrical generator. An attachment frame is provided, to which the wiring unit is operably affixed, and which, in turn, is operably configured to be rigidly affixed to the at least one electrical generator.

DETAILED DESCRIPTION OF THE INVENTION

Figure 1:
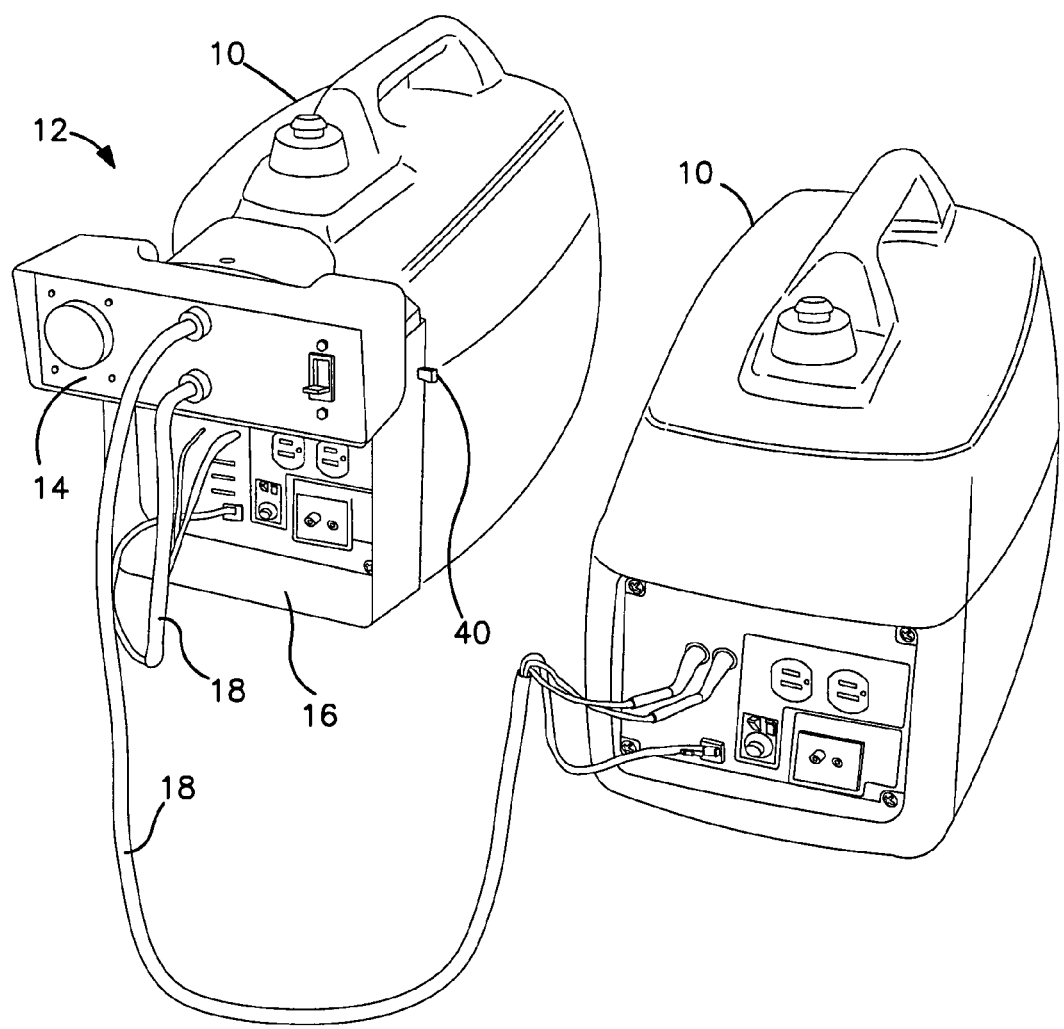
FIG. 1 is an illustration of a pair of power generation devices, connected in parallel by a parallel connection kit according to a preferred embodiment of the invention.

While this invention is susceptible of embodiment in many different forms, there is shown in the drawings and will herein be described in detail, a preferred embodiment with the understanding that the present disclosure should be considered as an exemplification of the principles of the invention and is not intended to limit the invention to the embodiment so illustrated.

Any numerical values or specific component identifications provided in the specification or drawings herein are provided solely as examples of the invention, and the invention is not to be construed as limited thereto.

Figure 2:
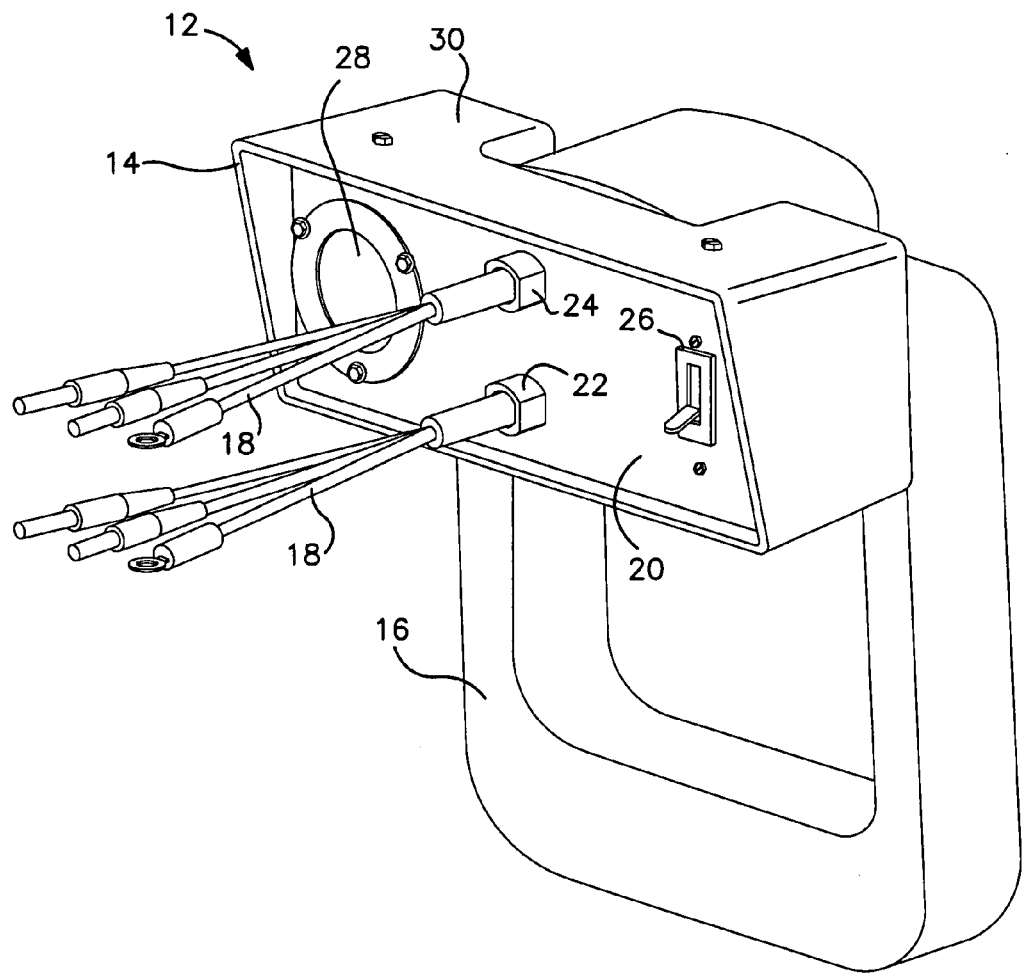
FIG. 2 is a perspective view of a parallel connection kit according to a preferred embodiment of the invention.

FIG. 1 illustrates a pair of power generation devices 10, connected in parallel electrical arrangement by parallel connection kit 12. Kit 12 includes wiring unit 14, attachment frame 16 and two wiring harnesses 18. A schematic illustration of kit 12 is given in FIG. 2, in which wiring harnesses 18 are shown in truncated form. Wiring unit 14 includes face plate 20, in which are set power connections 22, 24, circuit breaker 26, and power outlet receptacle 28; and shell 30. Attachment frame 16, and the components of wiring unit 14 may be fabricated from any material suitable for electrical power transmission accessory applications, including metal and plastic. In a preferred embodiment of the invention, the face plate is fabricated from a suitable metal material, such as stamped steel or the like, and the shell 30 is fabricated from a plastic material.

Attachment of wiring unit 14 in a semi-permanent manner is a key feature of the present invention. This semi-permanent, "rigid" attachment is accomplished through the fastening of attachment frame 16 in a rigid manner to one of the power generation units, such as with screws or bolts, preferably making use of existing bolt or screw apertures in the power generation unit. There is known to be, for example, a particular power generator, for which a bracket is made, for holding a light kit, to convert the entire unit into essentially a large gasoline powered flashlight. This bracket is provided with fastener apertures which align with existing fastener apertures in the outer housing of the generator. In a preferred embodiment of the invention, that existing bracket may be used for attachment of wiring unit 14. However, it is to be understood that for alternative embodiments of the invention, in which the wiring unit is to be attached to other makes and models of generator, the shape of the attachment frame may and likely will be different, and need not conform closely to the contours of the generator, see, e.g., FIGS. 16-22 (though from an aesthetic viewpoint it would be desirable to have the attachment frame conform more or less closely to the generator contours) so long as the attachment frame is configured to be susceptible of rigid attachment to the generator housing.

Figure 11:
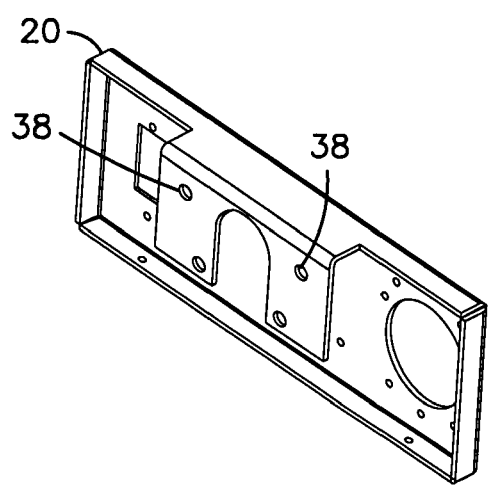
FIG. 11 is a rear perspective view of the front plate of the parallel connection kit.
Figure 12:
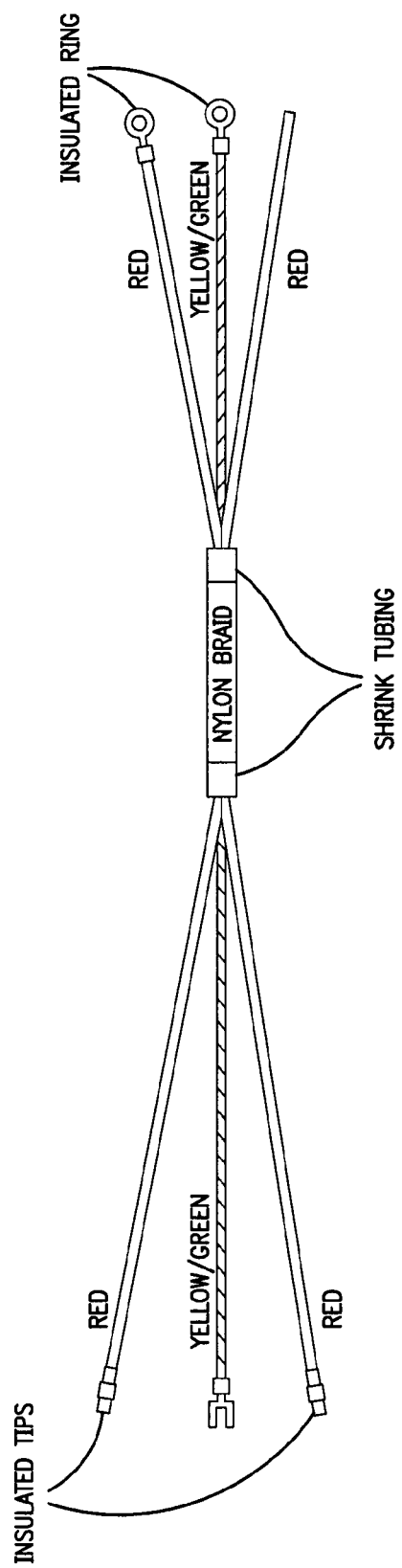
FIG. 12 is a side view of an exemplary wiring harness for the parallel connection kit of the present invention.

Inasmuch as attachment frame 16 happens to have an upper housing bulge 32 (which is configured for attachment of a lighting kit, as indicated above), rear shell 30 is preferably provided with rear recess area 34. Shell 30 will be provided with suitable fastener apertures to enable fixed attachment of shell 30 to attachment frame 16 by, e.g., bolts 36, which will engage with suitably threaded fittings 38 (FIG. 11) in the rear of face plate 20.

Figure 13:
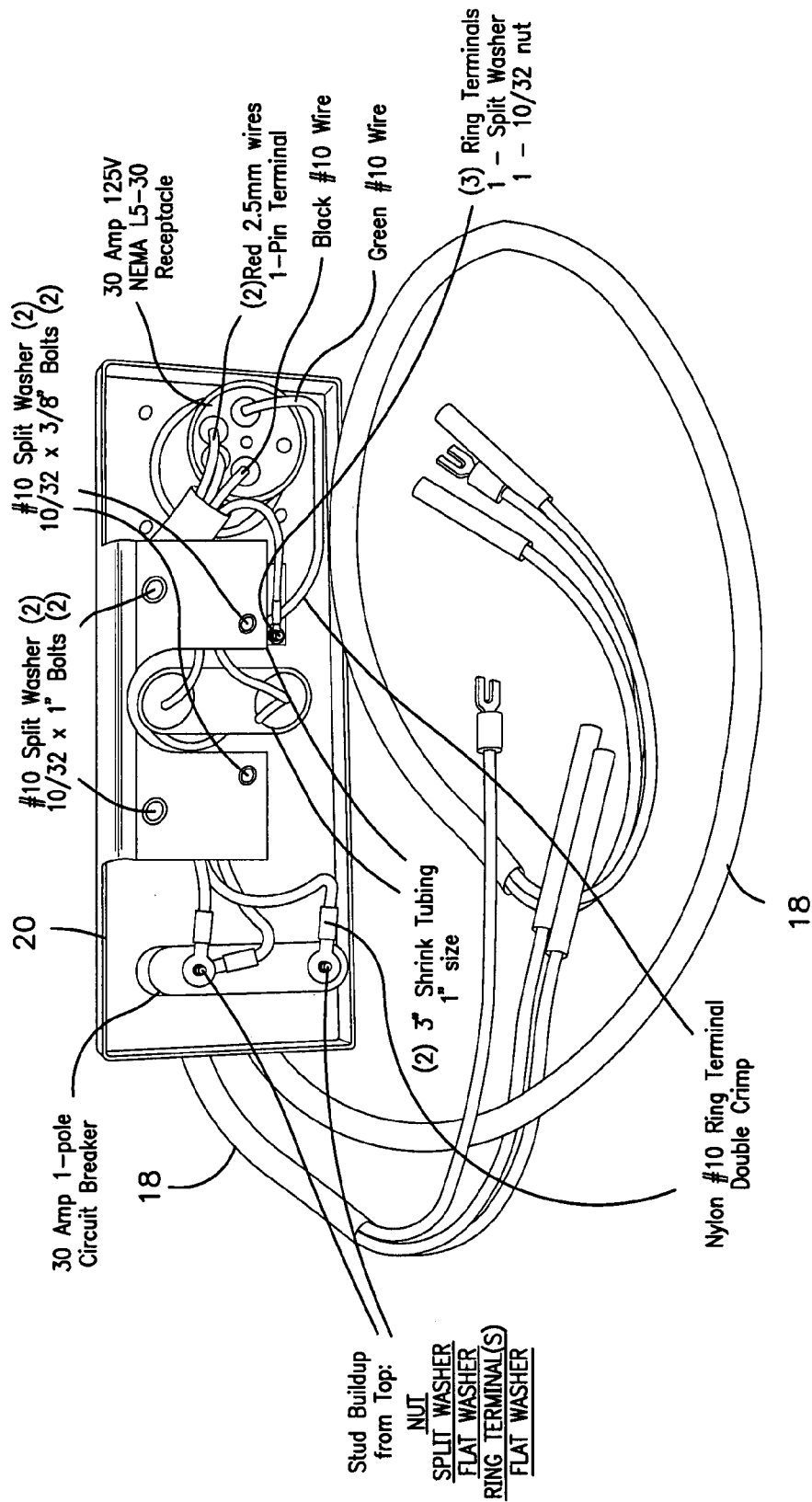
FIG. 13 is an illustration of the electrical connections within a wiring unit according to a preferred embodiment of the invention.

Wiring unit 14 contains only passive electrical connections, and not active circuitry (see FIG. 13) which is used to connect the generator input fittings 22, 24, circuit breaker 26 and receptacle 28 (all of which are fitted to suitably shaped openings in face plate 20, and affixed thereto, e.g., by screws or bolts). The manner of wiring the components together is shown in FIG. 13, and would be readily understood by one of ordinary skill in the art of power generator accessories, having the present disclosure before them.

Figure 3:
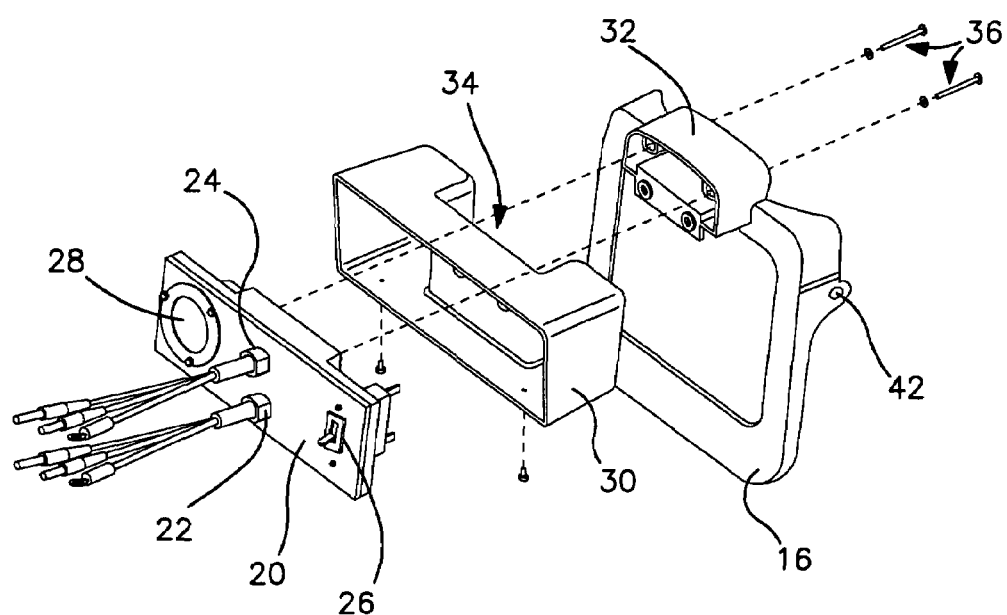
FIG. 3. is a perspective exploded view of the parallel connection kit according to the embodiment of FIG. 2.
Figure 4:
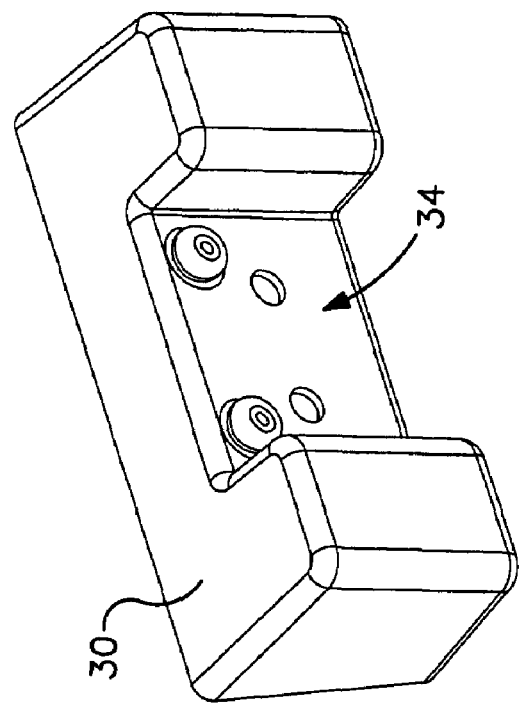
FIG. 4 is a rear perspective view of the housing shell for the parallel connection kit according to the embodiment of FIG. 2.
Figure 5:
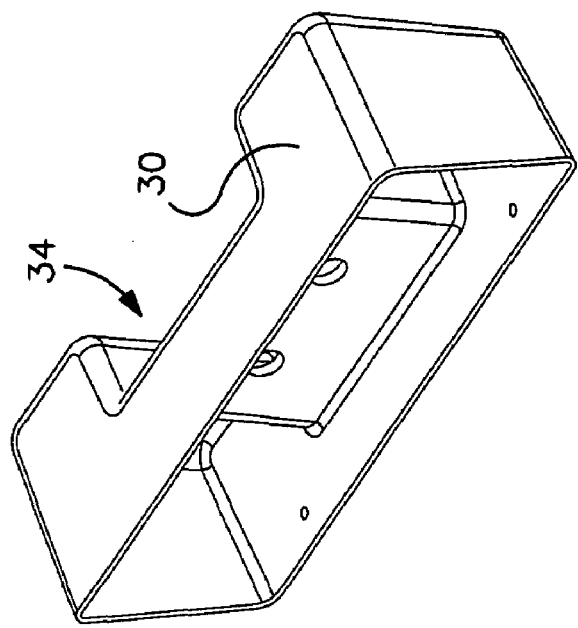
FIG. 5 is a front perspective view of the housing shell for the parallel connection kit according to the embodiment of FIG. 2.
Figure 8:
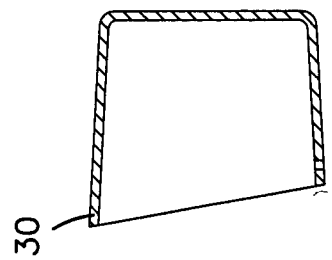
FIG. 8 is a side elevation, in section, taken along line C-C of FIG. 6.
Figure 7:
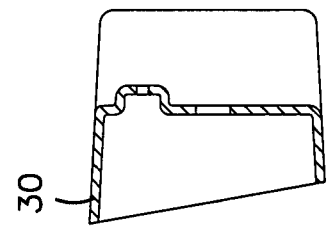
FIG. 7 is a side elevation, in section, taken along line A-A of FIG. 6.
Figure 9:
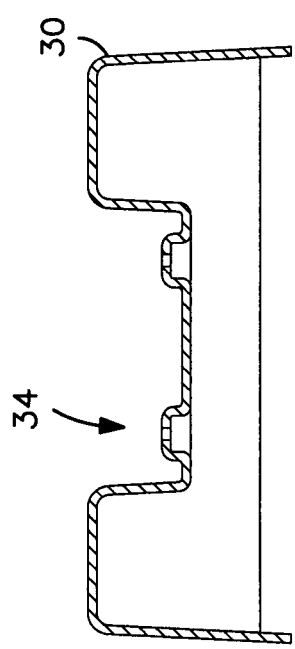
FIG. 9 is a side elevation, in section, taken along line B-B of FIG. 6.
Figure 6:
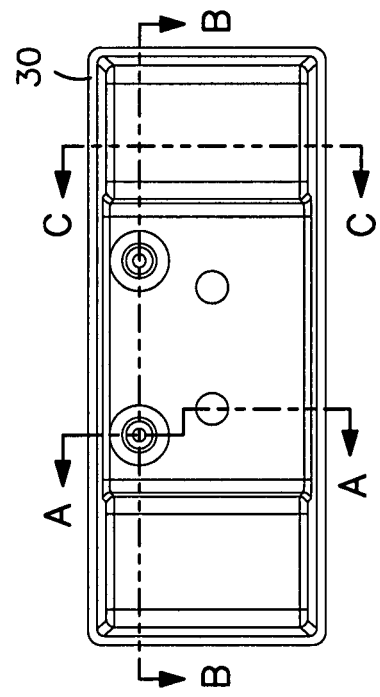
FIG. 6 is a front elevation of the housing shell of FIG. 5.
Figure 10:
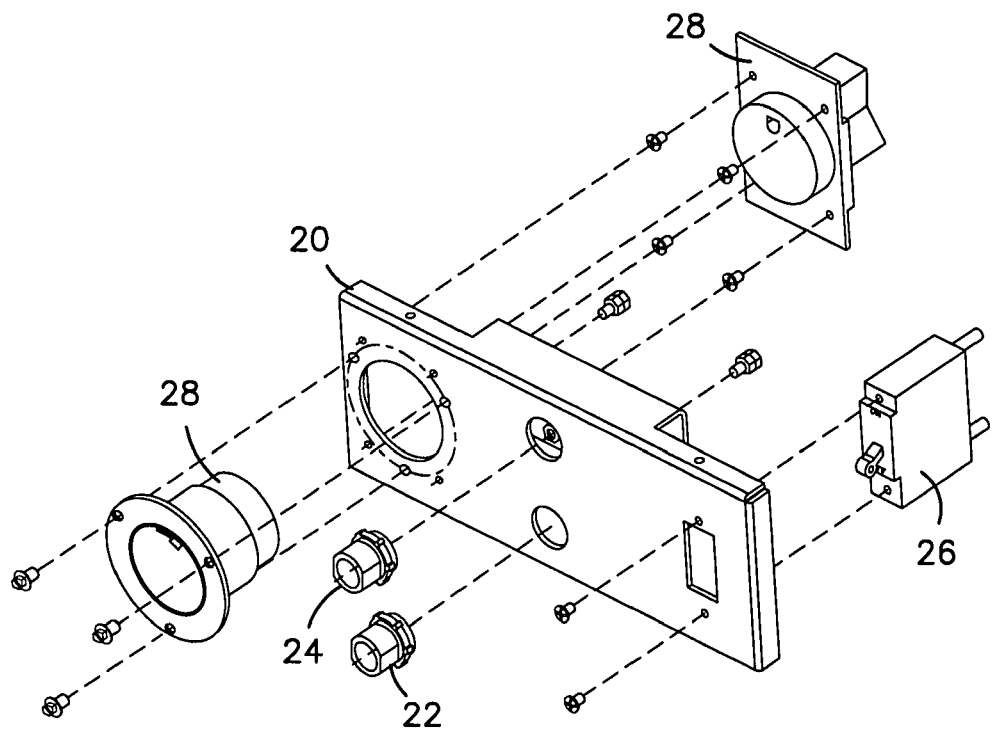
FIG. 10 is a front perspective exploded view of the front plate assembly of the parallel connection kit.
Figure 14:
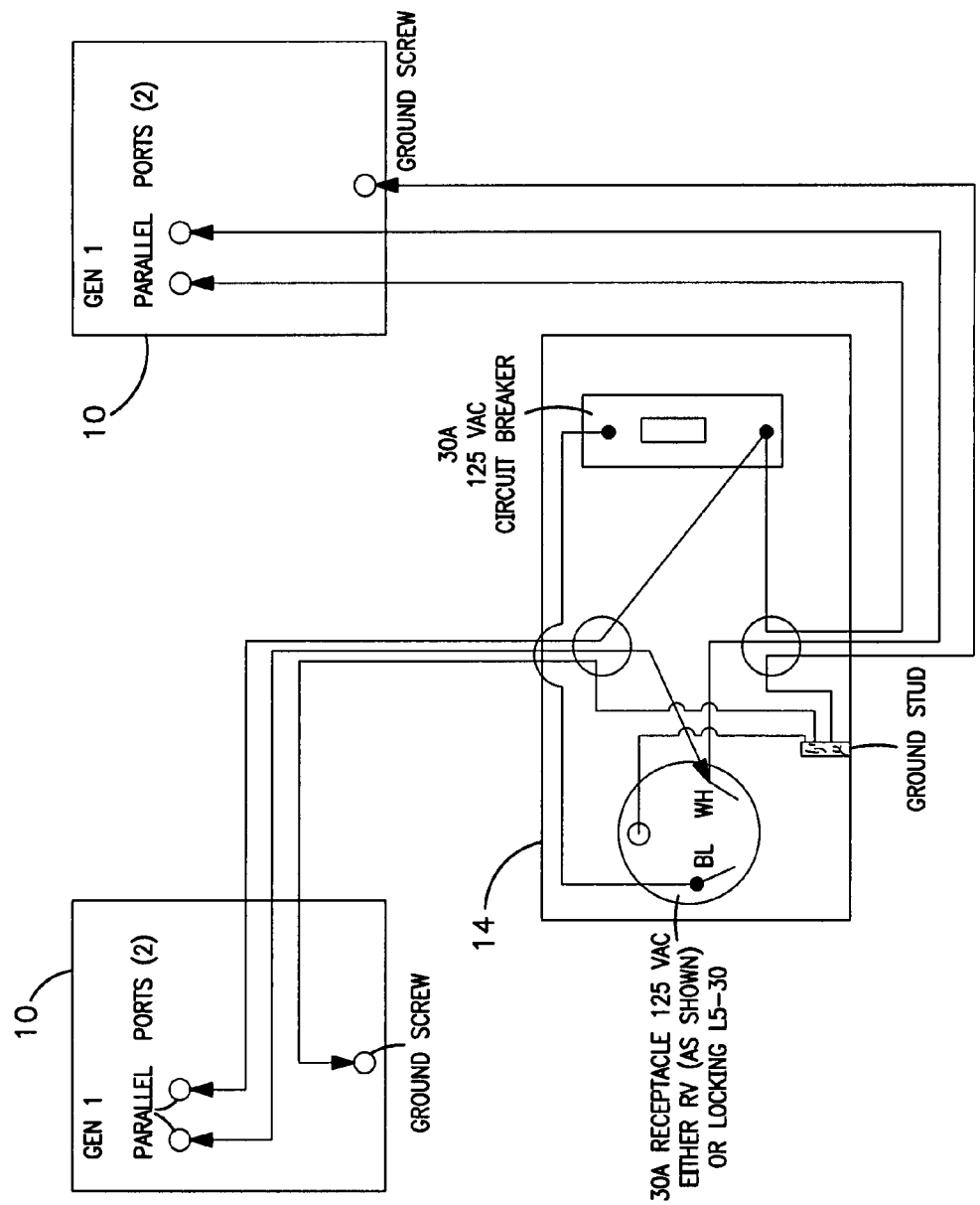
FIG. 14 is a schematic wiring diagram for the external electrical connections and internal wiring of the wiring unit for the parallel connection kit according to a preferred embodiment of the invention.

Once wiring unit 14 has been assembled, and affixed to attachment frame 16, the entire assembly may then be affixed in a rigid manner to the generator 10, such as by screws 40 (FIG. 1) through fastener apertures 42 (FIG. 3), which screws 40 are preferably advantageously part of the existing fastener scheme of generator 10. In an alternative embodiment, new fastener apertures may be carefully formed in the housing of generator 10, to accommodate fastener apertures in an attachment frame that is not necessarily already specifically contoured to conform to the generator housing. FIG. 14 is a schematic illustration of the preferred electrical connections to be made between the parallel connection kit and the two generators, and the wiring inside of wiring unit 14. Any numerical values provided are shown by way of example only, and the invention is not limited to those specific numerical values.

Figure 15:
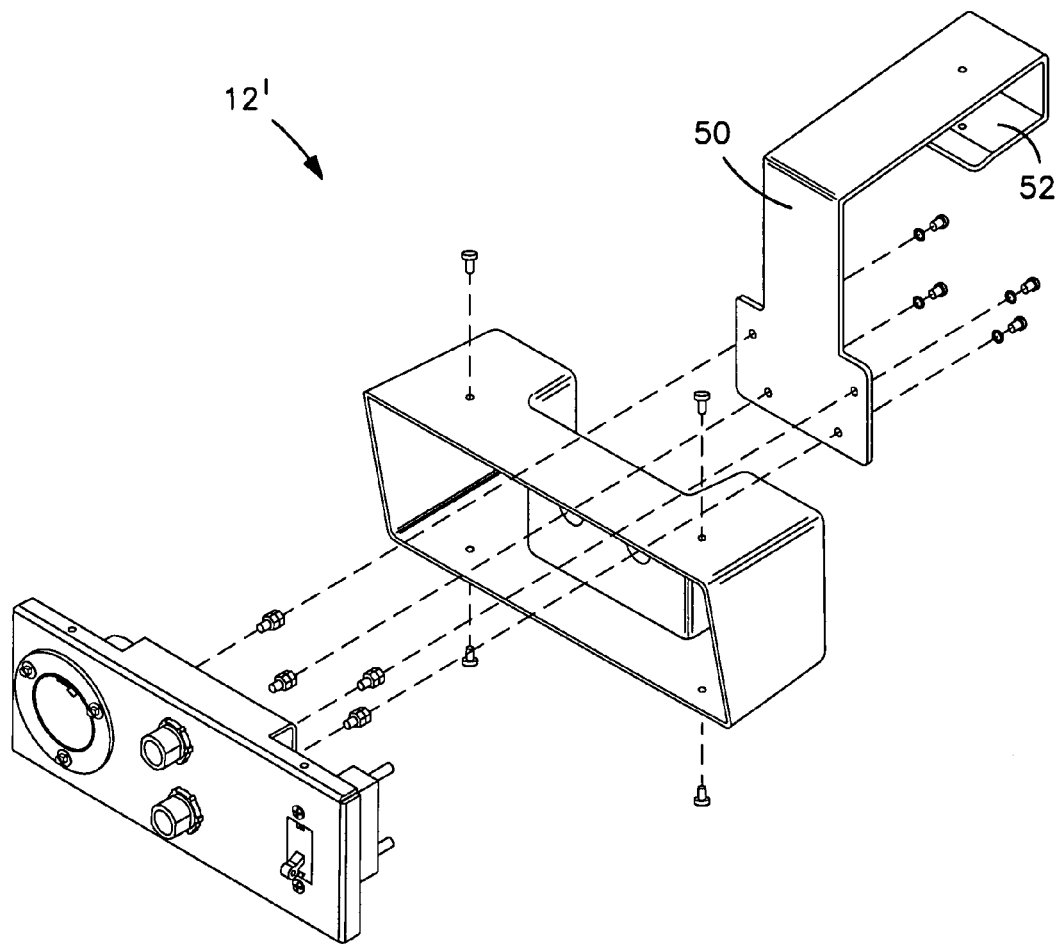
FIG. 15 is a perspective exploded view of a parallel connection kit according to an alternative embodiment of the invention, incorporating an alternative rigid attachment frame.
Figure 16:
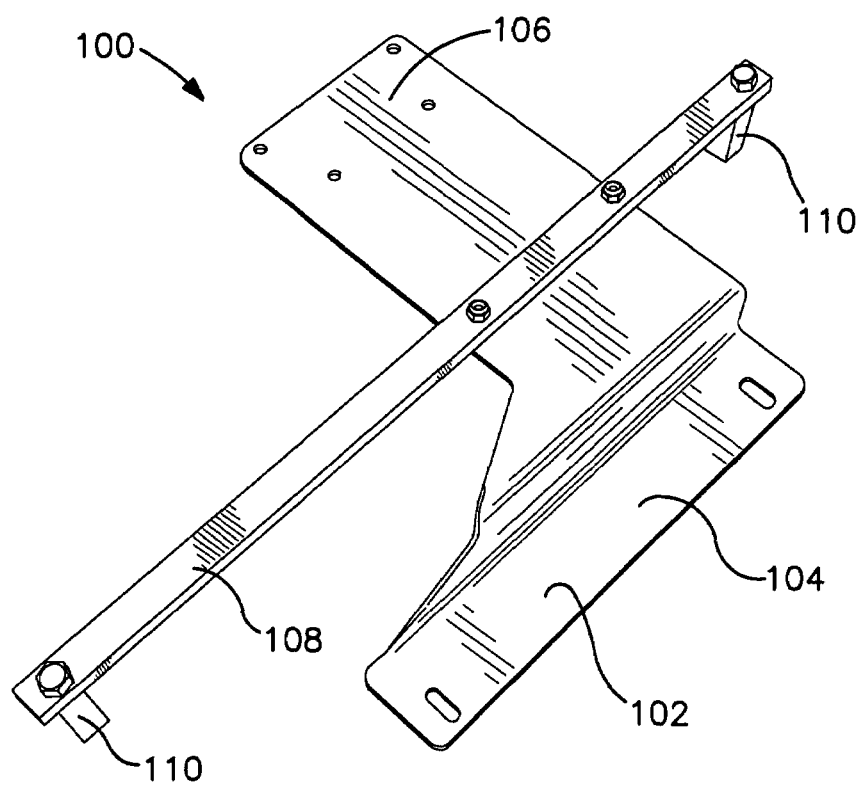
FIG. 16 is a perspective view of an alternative rigid attachment frame for the parallel connection kit of the present invention.
Figure 17:
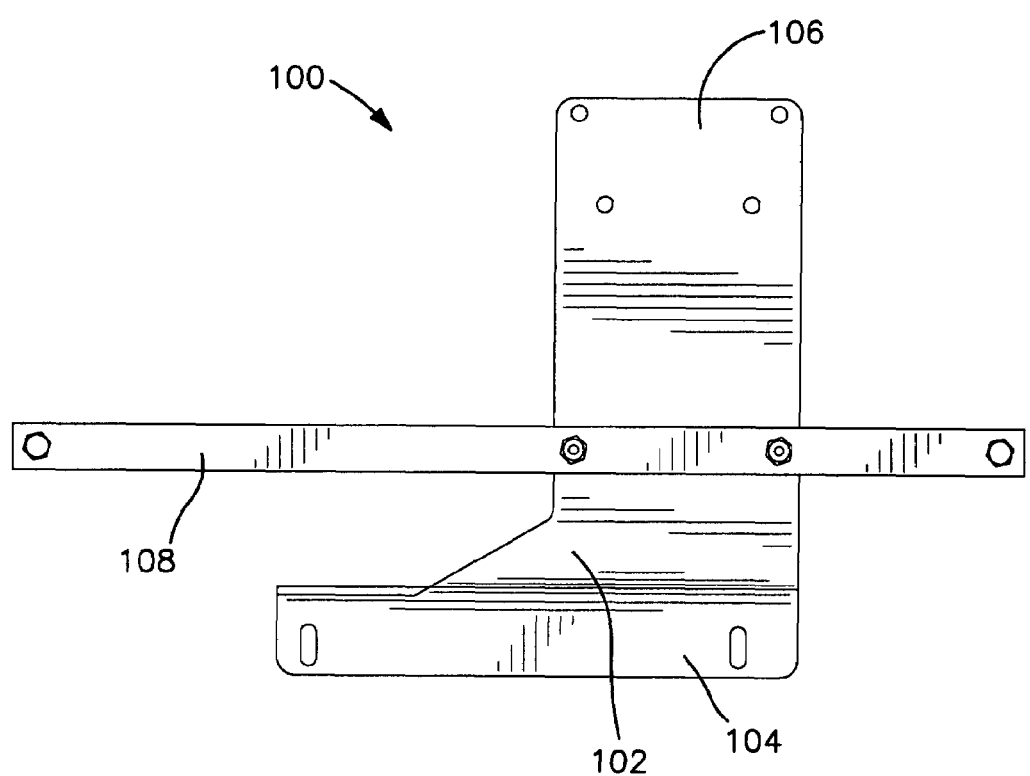
FIG. 17 is a front view of the frame of FIG. 16.
Figure 18:
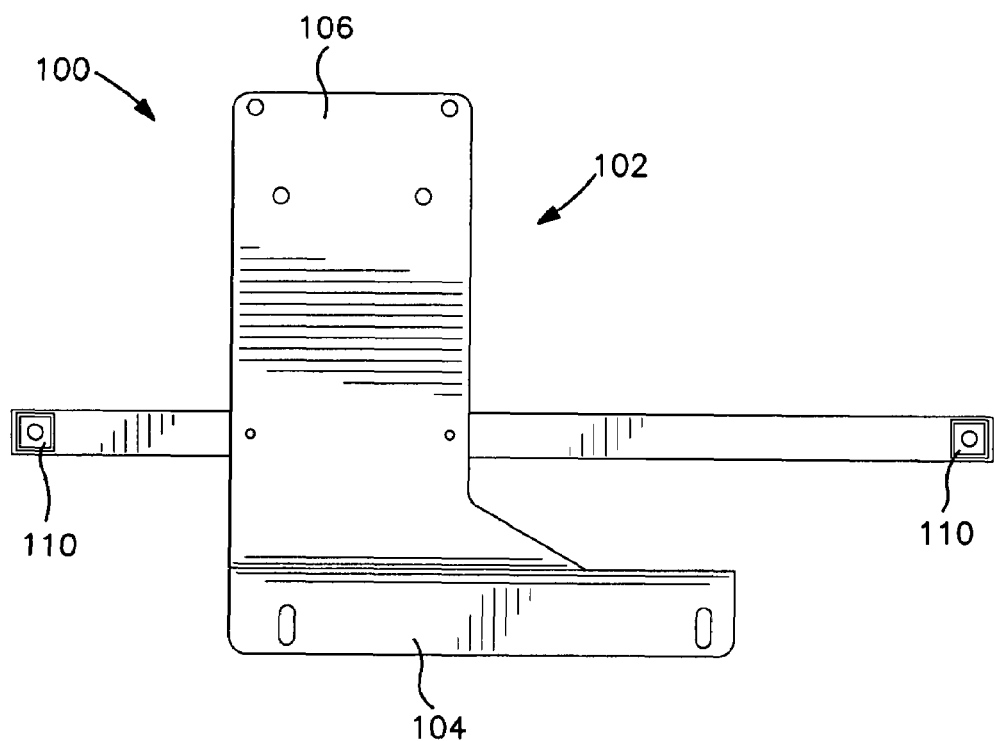
FIG. 18 is a rear view of the frame of FIG. 16.
Figure 19:
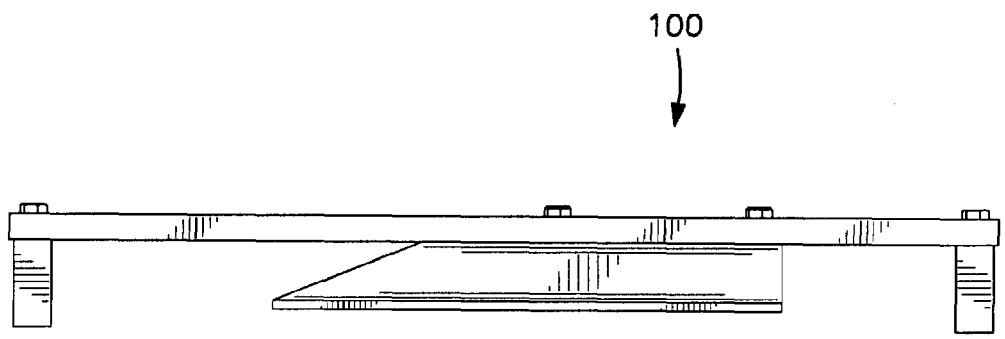
FIG. 19 is a view from one side of the frame of FIG. 16.
Figure 20:
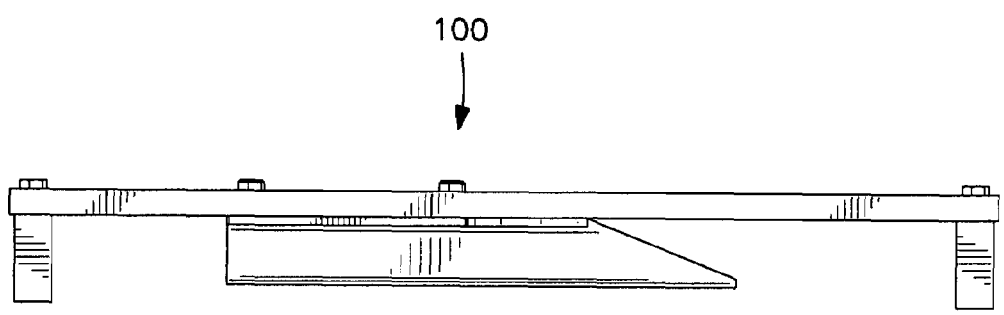
FIG. 20 is a view from an opposite side, to that of FIG. 19, of the frame of FIG. 16.
Figure 21:
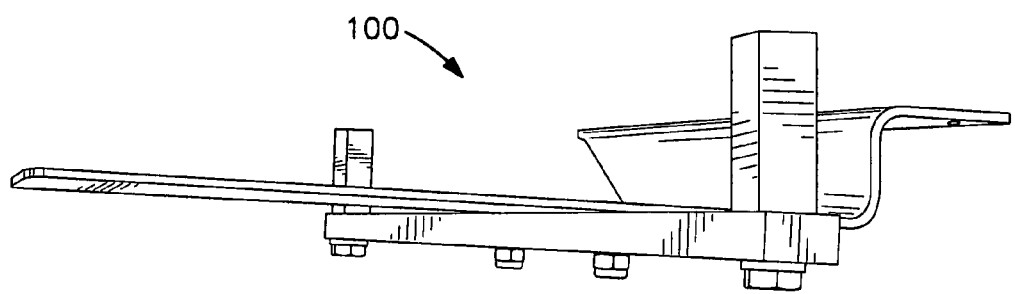
FIG. 21 is an end perspective view of the frame of FIG. 16.
Figure 22:
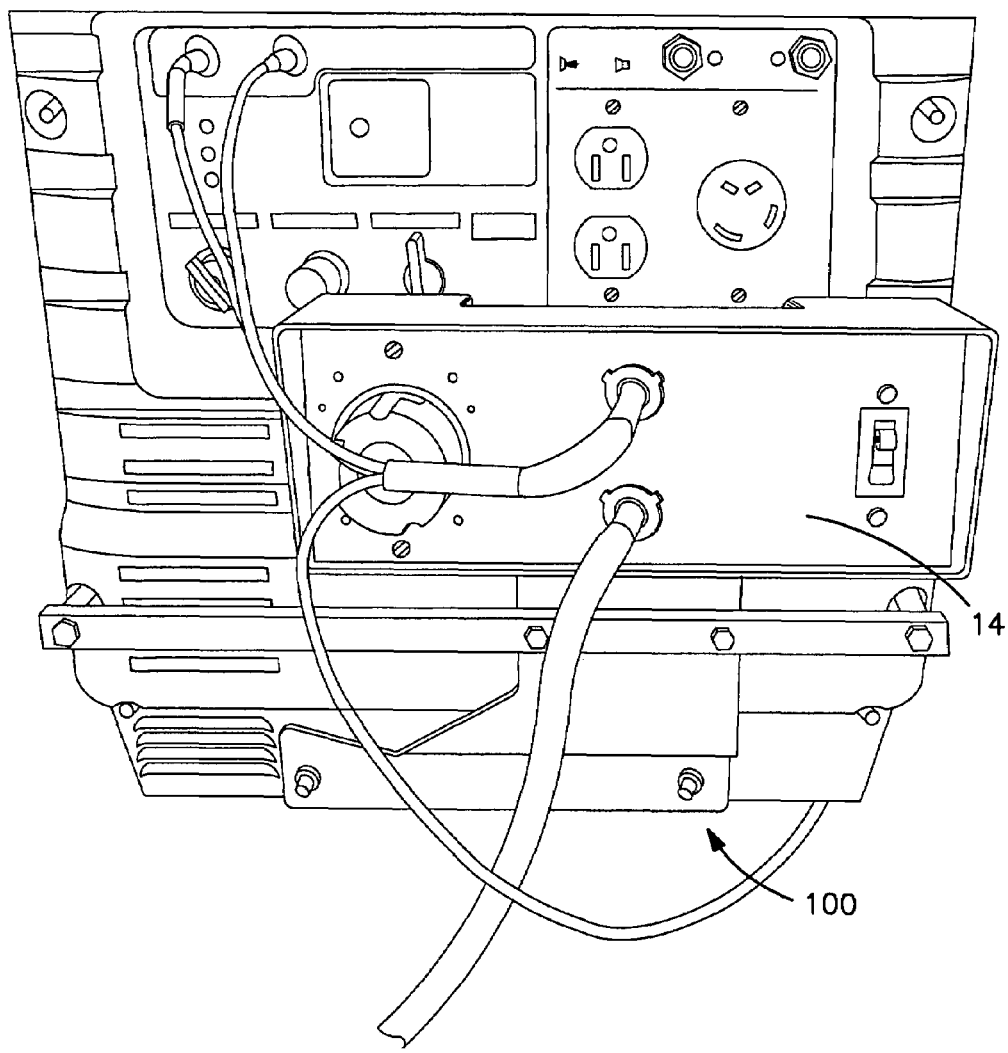
FIG. 22 is an illustration of a power generator, having a wiring kit mounted thereon, using the frame of FIGS. 16-21.

FIG. 15 is a perspective exploded view of a parallel connection kit 12' according to an alternative embodiment of the invention, incorporating an alternative rigid attachment frame 50, which is configured to be hung from a handle of the generator. Preferably, hook portion 52 is configured to relatively snuggly grip the handle of the generator, to provide for the wiring unit to be relatively rigidly supported on the generator, without swinging from side to side.

The parallel connection kit may be employed to make a connection between two small portable generators (as shown in the figures), which generators are then connected to the load, which may be a household circuit, as previously described (preferably via a generator transfer switch, for safety's sake), or which may be a recreational vehicle (RV) or camper circuit, through the use of a standard shore power hookup cord, with an approved plug/receptacle combination.

FIGS. 16-22 illustrate an alternative frame 100, for use with wiring unit 14. Frame 100 includes plate 102, having a generator mounting web 104, and a wiring unit mounting region 106 (which is bolted or screwed to the back of shell 30. Frame 100 also includes brace 108, which is affixed to plate 102 by any suitable fastener. Brace 108 includes pegs 110, which abut the face of a power generator (see FIG. 22).

Typically, portable power generators are provided with receptacles that are for receiving a three-pronged power plug, such as are commonly found on appliances intended for regular household use. Accordingly an alternative use of the connection kit of the present invention is not necessarily to electrically connect in parallel two different generators, but to provide a single generator with an alternative power outlet receptacle, which may be provided with an alternative plug configuration, such as for accepting a "pigtail" plug (as illustrated) or a shore power plug, as previously mentioned. In this mode of operation, the connection kit serves as a power receptacle adapter.

The foregoing description and drawings merely explain and illustrate the invention, and the invention is not so limited as those skilled in the art who have the disclosure before them will be able to make modifications and variations therein without departing from the scope of the invention.

What is claimed is:

1. A kit for connecting the electrical outputs of at least two electrical generators in parallel, comprising:

a wiring unit, having at least two input electrical connections, operably configured to receive electrical leads connected to the outputs of a corresponding at least two electrical generators, and at least one output electrical receptacle, operably configured to receive an electrical lead to be connected to a load; and an attachment frame, to which the wiring unit is operably affixed, and which, in turn, is operably configured to be rigidly affixed to one of the at least two electrical generators, through mechanical fasteners passing through the attachment frame and into housing regions of the one of the at least two electrical generators, so that when the attachment frame is attached to the one of the at least two electrical generators, the attachment frame is precluded from movement relative to one of the at least two electrical generators.

2. The kit for connecting the electrical outputs of at least two electrical generators, according to claim 1, wherein the wiring unit further comprises a circuit breaker electrically connected to the at least two input electrical connections and at least one output electrical receptacle, for providing overload protection to the at least two electrical generators when connected by the kit.

3. A first electrical generator, in combination with a kit for connecting the electrical outputs of the first electrical generator in parallel with at least one other electrical generator, comprising:

the first electrical generator;

a wiring unit, having at least two input electrical connections, operably configured to receive electrical leads connected to the output of the first electrical generator and the at least one other electrical generator, and at least one output electrical receptacle, operably configured to receive an electrical lead to be connected to a load; and an attachment frame, to which the wiring unit is operably affixed, and which, in turn, is rigidly affixed to the first electrical generator, through mechanical fasteners passing through the attachment frame and into housing regions of the first electrical generator, so that when the attachment frame is attached to the first electrical generator, the attachment frame is precluded from movement relative to the first electrical generator.

* * * * *